United States Patent [19]

Weingart

[11] 4,264,278

[45] Apr. 28, 1981

[54] BLADE OR SPAR

[76] Inventor: Oscar Weingart, 5219 Telefair Way, Riverside, Calif. 92506

[21] Appl. No.: 32,674

[22] Filed: Apr. 23, 1979

Related U.S. Application Data

[62] Division of Ser. No. 847,041, Oct. 31, 1977.

[51] Int. Cl.³ .................. F01D 5/12; B32B 27/12
[52] U.S. Cl. ................... 416/226; 416/230; 156/189; 156/195; 428/105; 428/112; 428/113; 428/222; 428/245; 428/365; 428/375; 428/392; 428/902
[58] Field of Search ............. 428/113, 114, 112, 105, 428/365, 371, 392, 902, 222; 416/230, 223 R, 241 A, 226, 278 A; 156/173, 175, 195, 189, 190, 201, 172, 174; 114/89

[56] References Cited

U.S. PATENT DOCUMENTS

| | | | |
|---|---|---|---|
| 3,321,019 | 5/1967 | Dmitroff et al. | 416/230 |
| 3,551,268 | 12/1970 | Casadevall | 428/112 |
| 3,700,527 | 10/1972 | Grosh | 156/174 |
| 3,950,115 | 4/1976 | Euler | 416/230 A |
| 3,962,506 | 6/1976 | Dunahoo | 428/158 |
| 4,081,220 | 3/1978 | Andrews | 416/230 A |

*Primary Examiner*—Paul J. Thibodeau
*Attorney, Agent, or Firm*—John E. Wagner; Jerry R. Seiler

[57] ABSTRACT

An improved elongated blade or blade spar comprises successive low-pitch circumferentially wrapped convolutions of a synthetic resin impregnated tape having elongated cut glass and substantially parallel and equal length filaments wherein successive convolutions are overlapped approximately 50% and wherein the axis of the elongated strands lie at an angle of less than 30° from the elongated spar axis. Preferably, resin impregnated filamentary strands are circumferentially wrapped around the mandrel substantially parallel with the direction of the tape wrap between selected tape layers. The improved blade spar mandrel wrapping apparatus includes a split ring support for the mandrel and through which the mandrel extends. The support ring halves may be separated, moved and rejoined during the mandrel wrapping process.

6 Claims, 10 Drawing Figures

BLADE OR SPAR

This is a division of application Ser. No. 847,041, filed Oct. 31, 1977.

BACKGROUND OF THE INVENTION

The use of wind power for producing energy has become increasingly important as petroleum and other fossil fuel costs have risen dramatically during recent years. A national wind energy program has been established to develop necessary technology to economically produce wind energy systems capable of generating significant quantities of electrical power. Large wind turbines of the type for driving 100 kw and larger generators require very long blades of at least 60 feet, and up to 300 feet. Such blades have complex shapes and critical structural requirements. Although lightweight metals including aluminum and the like have been proposed, synthetic resin impregnated glass fiber composite structures offer greater strength to weight characteristics, and offer the potential for low cost, one piece construction, and are thus preferred. It is to the production of such glass fiber structures having high axial stiffness that the present invention is directed.

Processes incorporating resin impregnated glass fiber tape wrapped on mandrels are well known. Nose cone structures often utilize tapes helically wrapped with substantial overlap between tape layers such as disclosed in U.S. Pat. Nos. 3,551,268 and 3,726,751. However, high temperature resistance characteristics are of prime importance and long fiber tapes wrapped for longitudinal axis orientation to optimize axial strength and stiffness requirements are not of primary concern. In U.S. Pat. No. 3,490,983, more complex tapered wing-box beams are given axial strength requirements by machine winding polar wrapped tape layers and hand wrapped tape layers at 45° angles.

Transverse filament tape winding has been proposed for reinforcing plastic pipes as disclosed in U.S. Pat. No. 3,676,246. However, such pipes do not have the complex tapered shapes of the blades and blade spars. Because of this, the proposed tape incorporates only a few locking threads glued to the glass filaments, which tape does not achieve the flexibility and performance characteristics in winding the complex blade and spar structures while achieving critical fiber orientation along the entire structure length according to the present invention. Moreover, the tape is wound on the pipe so that only the tape ends are overlapped unlike that of the present invention.

SUMMARY OF THE INVENTION

The present invention is directed to the fabrication of elongated wind turbine blades and/or spars. The blades meet the requirements of high axial strength and stiffness and at the same time in a tapered wall thickness in order to meet structural and aerodynamic specifications. The specific transverse filament tape incorporated in the structure of the present invention and used in the process of such production comprises elongated glass filaments which are woven with approximately 99% of the "fill" or "woof" material extending or lying in one direction with the elongated filaments being of substantially equal length and substantially parallel. This unique tape, which properties will be further described hereinafter, is wrapped around a mandrel in such a manner that the axis of the elongated parallel filaments lies at an angle of less than about 30° relative to the elongated spar mandrel axis. Preferably, the tape is circumferentially wrapped at a low pitch on the elongated and tapered blade or spar mandrel so that a major amount, over 50%, of the elongated glass tape filaments lie substantially parallel with the blade or spar axis.

In producing the spar composite of the invention, the transverse filament tape is wrapped so that there is substantial overlap between successive helical convolutions. Where uniform spar wall thickness is critical, successive convolution overlap is about 50% wherein the tape edges or transverse filament ends will be at maximum separation in any tape layer. Moreover, during the tape winding process, where successive layers are properly staggered, the presence of filament ends (tape edges) in any plane perpendicular to the spar axis can be minimized. Further, elongated glass filaments may also be circumferentially wrapped between selected tape layers in order to provide compaction and desired transverse and shear properties. In addition, layers of tape or helical filament winding at other angles, such as ±45°, may be incorporated to increase tensional and shear strength and stiffness.

When winding the elongated blade or spar on a rotating mandrel, an improved apparatus includes a split ring or plate support which is clamped to the mandrel and which rotates on a roller support. The split ring device may be adjusted during the mandrel winding process with minimum interruption. The use of such an intermediate support allows the use of a slender rotating mandrel without undue deflection. Such a winding apparatus and process further allows for the use of a one piece mandrel which may be easily extracted, which is highly advantageous over the state of the art processes using split or segmented mandrels. Moreover, the resulting one piece structure reduces production costs, and also is less subject to stress risers and fatigue failures as compared to those prepared from multiple pieces. These as well as other advantages will be evident from the following detailed description.

DETAILED DESCRIPTION OF THE INVENTION

Although the drawings and explanation herein are directed primarily to blade spar production, it is to be understood that it is also applicable to full blade preparation, with only substitution of a blade-shaped mandrel, using techniques within the skill of the art. Observing FIG. 1, in fabricating the spar according to the invention, a transverse filament tape 16 is wrapped in a circumferential direction on a mandrel 10. The mandrel is elongated and has the general tapered shape of a blade spar or blade to be produced according to the invention. Any suitable mandrel may be used.

A typical mandrel has steel plate ribs welded to a shaft made of telescoping sizes of steel pipe. A sheet metal skin is wrapped around and welded to the ribs while the central shaft facilitates rib alignment and provides basic backbone upon which the mandrel is built. Prior to wrapping or winding on the mandrel, the mandrel skin is treated normally by spraying or painting on a resin release composition, which procedure is well known in the art.

Figure 7:
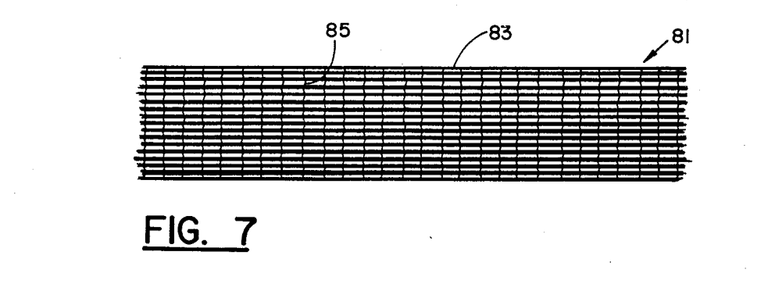
FIG. 7 is a fragmentary plan view of the transverse filament tape used according to the invention.

The transverse filament tape used in producing the spar according to the invention is illustrated in FIG. 7. The partial view shows the tape 81 comprising a unidirectional woven roving of bundles 83 of elongated glass monofilaments. The tape is continuous so that the filament lengths lie transverse or normal to the tape length. In the tape shown, the elongated filaments are substantially similar in that the filament lengths are the same as are the number of filaments in the bundles. The bundles are also separated quite uniformly and are joined by warp threads 85, which are present so as to hold the transverse filament bundles together. The warp threads may be any suitable material including nylon, rayon, polyester, and the like, woven in the form of a thread and which thread is then woven around each bundle as shown. The tape is woven so that at least 95% and preferably about 99% of the material present comprises the transverse filaments. The substantially unidirectional glass filaments may be either the E-Glass, S-Glass, or S-2 Glass type, all of which are readily available. Other suitable filamentary materials which may be selected for use include polyaramide (Kevlar), carbon, graphite, or boron, where product specifications so dictate.

The tape is wrapped on the mandrel so that uniform layers are deposited as the wrapping process continues. Since the strength of the spar is critical in the axial direction or along the elongated axis of the spar, the tape is wound on the mandrel so that the filament lengths extend generally parallel to the spar axis. In order to accomplish this, observing again FIG. 1, the transverse filament tape 16 is circumferentially wrapped on mandrel 10 as shown. As the mandrel is rotated tape 16 is paid out from a spool of tape 22, passed through the thermosetting synthetic resin which impregnates the glass filaments, directed through a squeegee 26 so as to remove excess resin and maintain resin uniformity on the tape, and then wound on the mandrel. Elongated filamentary glass strands 20 may be circumferentially wrapped between desired layers of the tape in order to improve composite strength and to provide further reinforcement of the structure by compacting the tape laminate. As illustrated, continuous filaments 20 are also passed through a thermosetting synthetic resin reservoir, through a squeegee assembly 21, and then wrapped on the mandrel. Because there is present only a relatively very small amount of warp threads in the tape, the tape is wrapped on the mandrel at relatively low tension. This low tension wrap significantly improves the winding over sharp edges, particularly where a blade is fabricated having, for example, a sharp trailing edge. On the other hand, the continuous circumferentially wound filaments 20, which are only a small percentage of the total composite thickness, are wound with normal filament winding tensions.

In order to provide for maximum uniformity of wall thickness in the spar composite structure, it is desirable to overlap successive convolutions of the tape approximately 50%. Observing further FIG. 1, it will be appreciated that in preparing the spar on an axially rotating mandrel, the assembly from which the tape is paid out to the mandrel will also move parallel to the mandrel axis as the process continues. Unlike conventional filament winding processes and apparatus in which filaments at a low angle to the axis must be wound at relatively slow payout speeds, the present apparatus and process allow high speed deposition of the composite material. Utilizing the procedure and apparatus of the present invention, extremely high axial spar strength and particularly high axial stiffness can be obtained on a continuous winding process by wrapping the transverse filament tape as previously described on the rotating mandrel with successive circumferential convolutions wrapped at relatively low pitches. Thus, with tape payout apparatus moving alongside of the rotating mandrel and in the direction of the mandrel axis, successive circumferential tape convolutions are overlapped approximately 50% so that with one pass of the payout apparatus along the mandrel length or portion, will achieve a double layer thickness of tape. Moreover, as this process is repeated with the payout apparatus direction being reversed or returned to start and repeated, another double tape layer will be wound on the mandrel, and as the process continues such even thickness deposition of the transverse tape achieves a highly uniform and superior composite material. However, some greater overlap may not only be tolerated, but in certain cases may be preferred, or even beneficial. For example, where the tape edges are at least slightly overlapped, a triple thickness will result in those overlap areas of a double layer wrap, thereby creating additional reinforcement in that naturally weaker area where cut filament ends are present.

In the spar winding process of the invention, not only is substantially even tape layer deposition achieved, but because of the unique qualities of the transverse filament tape, where the warp threads are highly flexible, the tape pay out apparatus can direct the tape onto the tapered mandrel so that a substantial portion of the filaments will extend axially along the mandrel length. More specifically and preferably, the tape will be wrapped so that a major amount of the filaments will extend parallel with the spar axis. Even more preferably, the tapered spar will be made up of a plurality of layers of the transverse filament tape in which approximately 80% or more of the longitudinally extending filaments will lie parallel in at least one plane with the spar axis. Being so wrapped, and with such parallelism of the transversely extending filaments in the tape, the axial strength and stiffness achieved in the finished composite material will be superior, similar to that which might be obtained by hand layup of pure axial filaments in broad goods form. Moreover, the reproducability of the instant process over such hand layed up products is superior, and is inherently more rapid, thereby improving efficiency and process economics.

Figure 6:
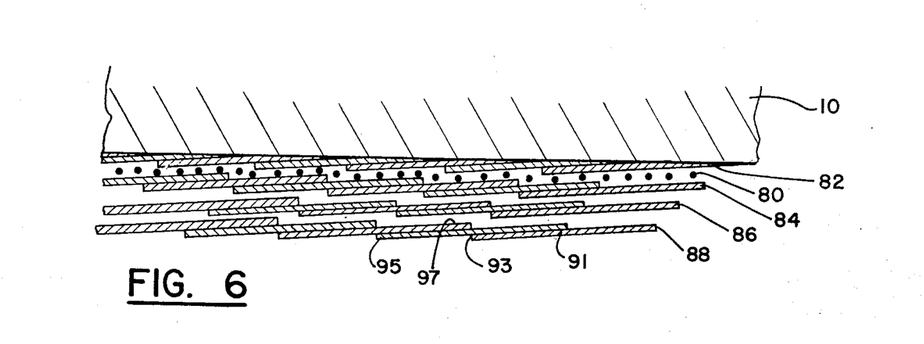
FIG. 6 is a fragmentary sectional view illustrating build-up of layers of transverse filament tape wound on a spar mandrel.

In FIG. 6 there is illustrated a cross-sectional view taken normal to the transverse filament and mandrel axes showing the buildup layer effect utilizing a 50% tape overlap on successive convolutions during the process. Thus, when the mandrel is rotated at a selected speed and the tape payout apparatus moves so that successive tape convolutions will be 50% overlapped, the result is that illustrated in FIG. 6. In such a process, in one pass of the payout apparatus along the mandrel length or length portion as desired, tape layer 82 will be wound and deposited. Then, on the next and successive laps or passes of the payout apparatus, layers 84, 86 and 88, respectively, will be deposited. A single layer 80 of circumferentially wrapped continuous filaments which extend transverse or normal to the tape filaments is illustrated between tape layers 82 and 84. It will thus be noted that with each pass of the tape payout or wrap apparatus along the mandrel or mandrel portion, a double thickness of tape will be deposited when the successive tape convolutions are overlapped 50%. This may be more particularly observed in tape layer 88 wherein tape bundle or wrap 91 is overlapped 50% from the previously succeeding wrap 95. In other words, leading edge 93 of layer 91 is approximately 50% of the length of the preceding tape layer 95. Although such a 50% overlap results in the edges of alternate or every other convolution coinciding along a vertical plane through the composite, i.e., observe edges 93 and 97, when successive layers are staggered as is illustrated, the incidence of filament ends or tape edges in any given vertical plane will be minimized. In the example illustrated, each successive layer has been moved over at its starting wrap position so that there is no coincidence of transverse filaments ends or tape edges between adjacent layers. Instead, successive tape layers are moved over so that filament end coincidence will occur along a single vertical plane at most only 25% of the time even when the plane is taken through a single tape edge. Obviously, when compared to the total composite length, the percentage of such filament ends occuring in any single plane becomes quite small. Thus, the skilled artisan can achieve any desired composite with uniform layer depth and minimizing filament ending planar coincidence as desired. The spar may be built up to any desired thickness, normally between about 0.1 inch and 2 inches. Suitable parts have been built with nominal ½ inch thickness incorporating 10 layers of tape, each layer comprising a double tape thickness.

It will be evident that FIG. 6 shows the tape layers as they are deposited in one direction only from the payout apparatus. Where the payout apparatus deposits tape in both directions, alternate layers will simply be reverse oriented from that shown. Further the filament length to thickness ratio is not that normally used. Instead, the transverse filament lengths are at least about 6 inches and preferably between about 12 and about 18 inches long. The bundles may contain between a few hundred and a few thousand monofilaments, so long as they are quite uniform. Although the drawing illustrates a two tape layer deposition for each payout apparatus pass with a 50% successive convolution overlap, a three layer deposition may be achieved by overlapping the successive convolutions ⅔ or 66⅔%. Again, with such a three layer pass deposition, staggering or offsetting successive adjacent tape layers will achieve desired tape edge coincidence. Moreover, as previously mentioned, some edge overlap to give triple thickness at the area of the tape ends may be desirable. For example, a 7 inch tape may be wrapped using a 3 inch pitch, thereby giving a 1 inch extra overlap or triple thickness in an otherwise double layer wrap. In preparing a full size blade or spar, a 17 inch tape may be wrapped with an 8 inch pitch, or a 25 inch tape with a 12 inch pitch, and so on, all to achieve additional reinforcement at the location where cut edges of two adjacent tape layers be in the same plane.

By the use of the circumferentially wrapped continuous strands between selected layers of deposited transverse filament tape, the structure of the composite is improved due to compaction of the underlying tape layers. As previously noted, the tape is wrapped under low tension, necessarily due in at least a part to the delicate and relatively minor amount of warp thread present in the tape and which thread is woven generally along the tape length direction. However, with intervening continuous glass filamentary material being wrapped in the circumferential direction, and at least generally parallel to the direction of the tape wrap, meshing and interleaving of at least some of the transverse filament ends along the edges of the tape into the spaces between the filament bundles of the underlying layers is achieved. In other words, because of the spaces between adjacent filament bundles within the tape layer, as the next succeeding layer is overlapped and deposited, the filament ends of that overlap convolution will become drawn into the spaces between filaments of the underlying tape convolution, or at least will be forced therein somewhat by the weight of the successive tape layer deposition. Moreover, such an effect will be further enhanced as the continuous circumferentially wrapped filaments further compact underlying tape layers. This feature then yields an added axial strength and important axial stiffness of the resulting composite.

Figure 1:
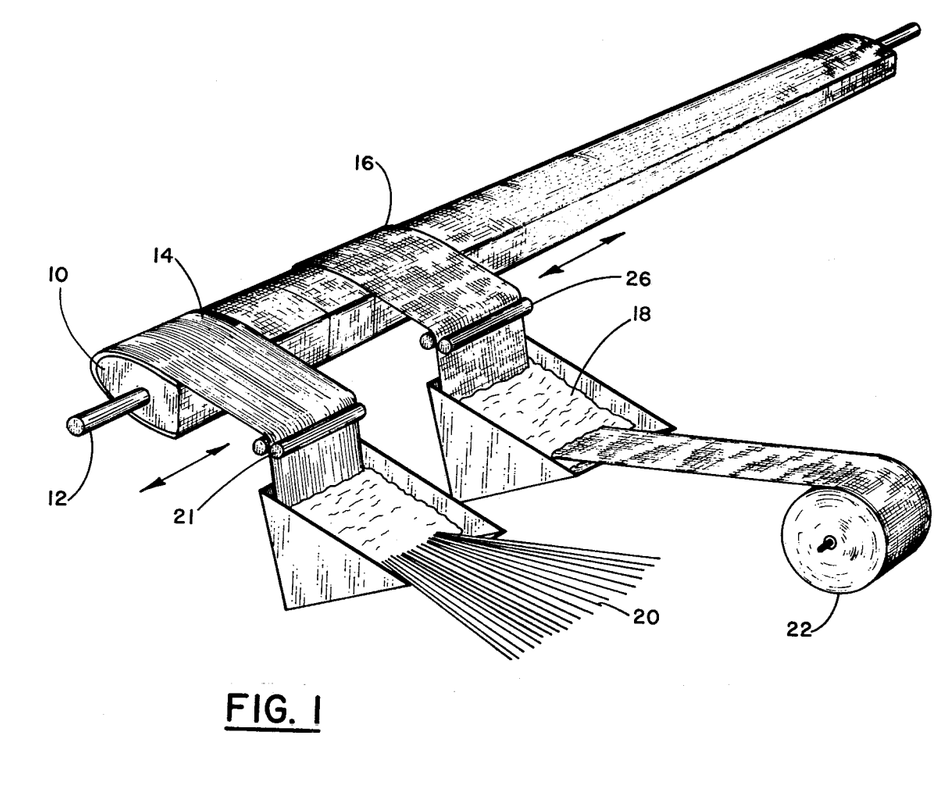
FIG. 1 is a view generally illustrating the spar mandrel wrapping process according to the invention.
Figure 2:
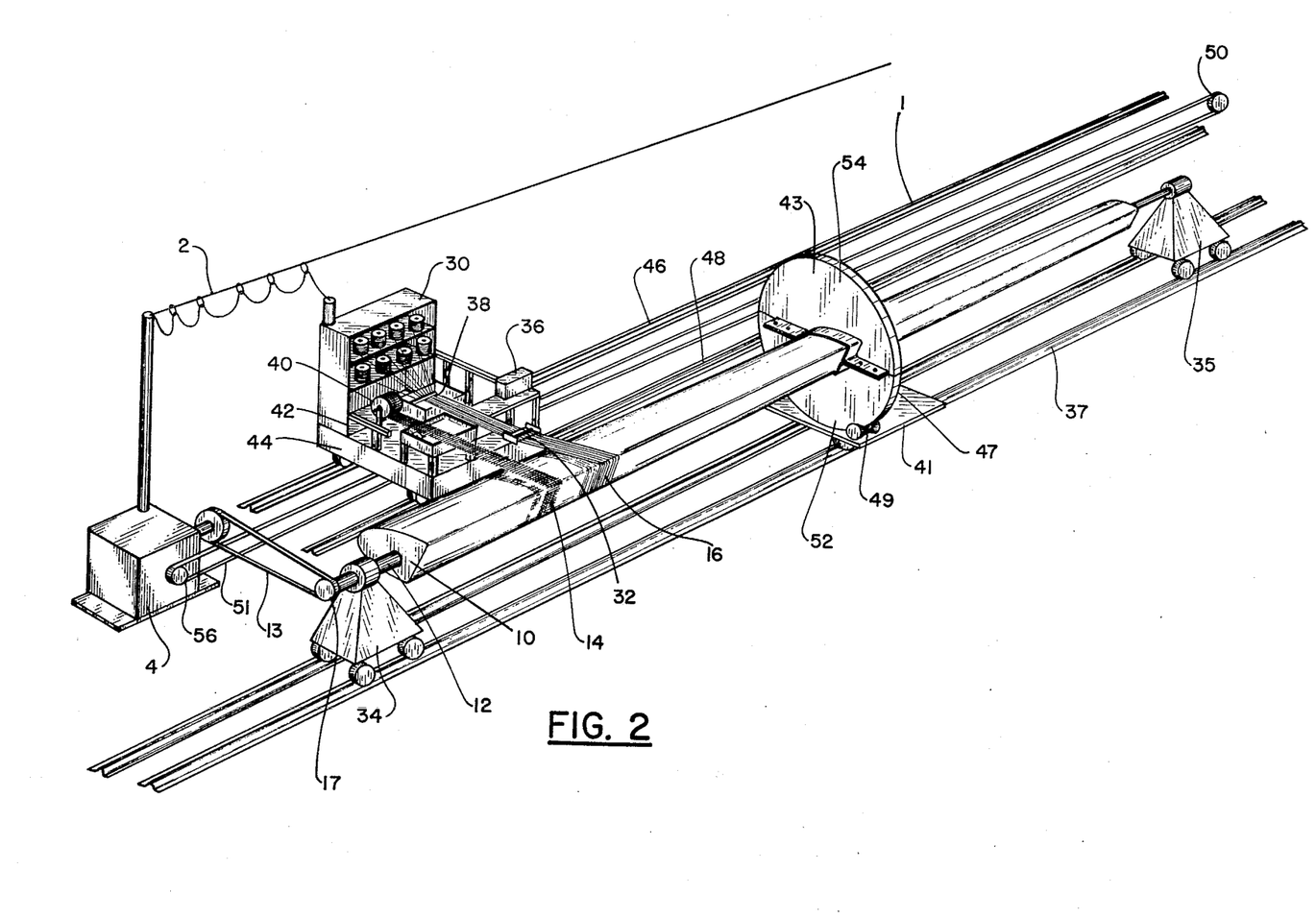
FIG. 2 illustrates apparatus used in spar production.
Figures 4, 5:
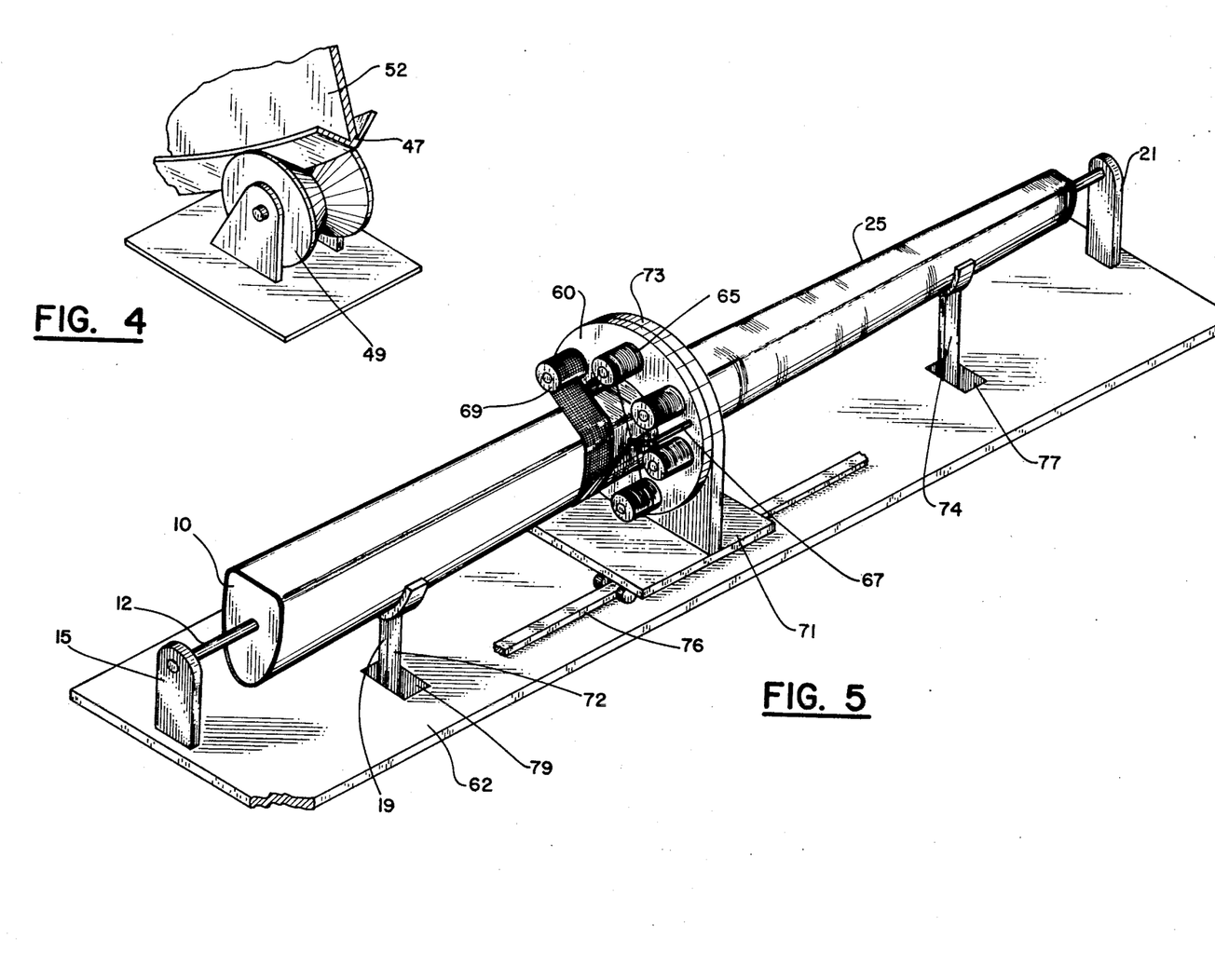
FIG. 4 is an enlarged fragmentary view of the support ring illustrating roller means on which the ring is guided.
FIG. 5 illustrates an alternative apparatus and method for producing the blade spar.
Figure 8:
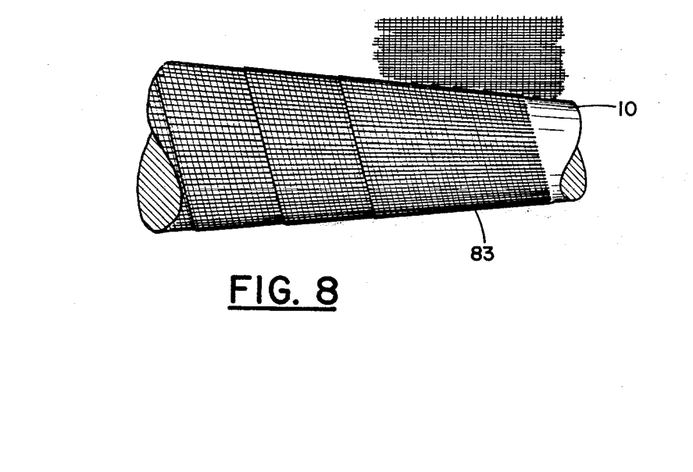
FIG. 8 illustrates "parallelogram" deformation of the tape used in the process of the invention.

FIGS. 1, 2 and 5 illustrate different apparatus and alternate means for producing a spar composite according to the present invention utilizing transverse filament tape which is wrapped on a one piece mandrel in a low pitch circumferential fashion. As previously noted regarding FIG. 1, the tape 16 is wrapped on the elongated and tapered or conical mandrel 10 as the mandrel rotates about axial shaft 12 while the tape payout apparatus is moved alongside the rotating mandrel in the direction of the double arrow. In other words, the payout apparatus moves alongside rotating mandrel in the mandrel axial direction. Since successive convolutions of the tape are overlapped preferably about 50%, or more, the pitch of the wrap is quite low, and the payout apparatus will move relatively slowly along side the rotating mandrel. Again, the transverse filament tape is circumferentially wrapped on the mandrel so that the length of the transverse filaments lie generally along the elongated mandrel axis. Such filament orientation is readily accomplished because of the tape characteristics as previously described, wherein the tape may be distorted much like a parallelogram due to the highly flexible and yet very minor amount of warp threads holding the tape and its bundles of filaments together. This feature is shown in FIG. 8 wherein it is evident that the filaments in the filament bundles are substantially oriented along the elongated mandrel axis. This feature is achieved because of the highly flexible nature of the tape, especially in the transverse direction allowed by the small amount of rather loosely woven warp and very flexible threads. Moreover, the tape used herein, because of its high flexiblity due to the loose warp thread characteristics, allows the tape to become more deformed or stretched along one tape edge than the other. Such a feature allows the tape to conform well to a conical or tapered surface without wrinkling as shown. The transverse filament orientation along the mandrel axis and tape deformation could not be achieved should warp filaments be glued or otherwise bonded to the transverse filaments, as in prior art filaments previously described, which would result in significantly increased tape rigidity, at least along the transverse filament axis. Such a parallelogram-type tape distortion may be accomplished with the instant tape regardless of the angle of tape wrap so as to orient the elongated transverse glass filaments of the tape properly. In addition, by using the instant tape, one wrap achieves the same tape-thickness, regardless of the mandrel periphery, a significant advantage over helical windings of tapered mandrels of the prior art. Again, preferably, at least a major amount of the filaments lie parallel to the elongated spar or blade mandrel axis, and more preferably at least about 80% of the filaments are parallel to that axis, i.e., along a plane extending both through the mandrel axis and a filament. This cannot be achieved by the helical windings of the prior art.

As the tape payout apparatus travels the full length or desired portion of the mandrel length, it may be reversed and returned to travel towards the other mandrel end, again paying out tape with the desired overlap of successive tape convolutions. Alternatively, if desired, the tape can be cut at the end of the mandrel, and the payout apparatus returned to the opposite mandrel end where tape deposition will again be started. However, because of the improved process of the invention, the direction of winding may be reversed at any point, without stopping the apparatus. Thus, the spar or blade may be wound up to the very end of the mandrel and then reversed without a turnaround area which would have to be trimmed off. Moreover, because of the spar or blade taper, since it may be desirable to reduce the number of layers of deposited tape as the spar narrows, this may simply be accomplished by reversing the payout apparatus movement at desired positions along the mandrel length during the process without interruption. Thus, tapered wall thickness may be built up easily and efficiently as desired without cutting the tape or dropping off layers. In addition, heavier tape buildup at the root spar or blade end as compared to the spar or blade tip may be accomplished without stopping the apparatus.

As previously noted and shown in FIG. 1, continuous filamentary strands 20 may be circumferentially wrapped between selected layers of tape. Conveniently, this circumferentially wrapped filament deposition may be accomplished alongside of and simultaneously with the tape deposition. Moreover, since the filaments themselves are made up of individual monofilaments, they are preferably spaced so that they will not build up into multiple layers during any single pass of the filament payout apparatus. In other words, the width of the band or ribbon of wrapped filaments is preferably such that only one layer of filaments will be deposited on a single pass of the filament payout apparatus as it moves or travels concurrently with the tape payout apparatus, possible on the same assembly as will be explained further hereinafter. These filaments may be wrapped so as to lie at an angle of between 70° and 110° relative to the transverse tape filaments, and preferably normal or transverse to the axis of the tape filaments and spar mandrel axis.

Conveniently, where the payout apparatus of the tape and filaments run on the same assembly, and are thus side by side, a single filament layer will be deposited for every two tape layers, assuming that the successive tape convolutions are overlapped 50%, with one pass of the payout apparatus. However, this filament to tape ratio may be varied by simply dropping off a filament winding on any pass of the payout apparatus as desired. Normally, the greatest amount of circumferentially wrapped filaments will be one layer of filaments for every two layers or thicknesses of tape. Yet, very structurally sound blade and spar composites may be produced with one layer or ply of hoop filaments for every four layers of tape. The preferred amount of circumferential filaments will be between about 10% and about 20% by weight of the filamentary material present in the composite. Again, however such composites are by way of example only, and the amount of circumferentially wrapped filaments may be selected to achieve any suitable desired composite structure characteristics.

Observing now FIG. 2, there is illustrated an embodiment of an apparatus for carrying out the process of the invention and producing a blade or spar composite. In the apparatus, a spar mandrel 10 is rotated about an axial shaft 12 which is supported by a pair of mandrel trunnions 34 and 35. Means for rotating the mandrel include a sprocket 17 fixed to one end of shaft 12 and a drive chain 13, which is driven by main drive assembly 54. Where movement of the mandrel in the assembly plane is desired, tracks 37 are provided and on which the trunnions can move. A carriage assembly 44 includes a creel 30, holding a plurality of spools of filamentary glass. The thread payout means includes a tray or reservoir 38 which holds a thermosetting synthetic resin such as polyester or epoxy and through which the glass filaments are drawn and impregnated with the resin. Other examples of resins which may be selected, as desired, include polyurethane, polyamides, phenolics, etc. The assembly will also include a squeegee means for removing excess resin. Normally, the amount of resin present in the cured composite will be between about 10% and 40% and preferably between about 20% and 30%, by weight. A payout restricter 32 will collect the filaments together for proper payout band width as the continuous filament band 16 is wrapped on the mandrel. The carriage apparatus also include means for dispensing and paying out transverse filament tape 14 from a roll or a reel 40, and also includes a reservoir 42 for thermosetting synthetic resin like that previously described. Means for supplying necessary electrical power to the carriage assembly conveniently comprises a festooned electrical cable 2, although any other suitable means, such as a cable reel or a sliding commutator may be provided. The control panel 36 may also include automatic means for programming the functions of the carriage assembly.

The tape and filament payout carriage assembly is conveniently driven along tracks 46 and 48 which are aligned substantially parallel with the mandrel axis of rotation or shaft 12. The carriage is conveniently driven by main drive 4 which includes drive sprocket 56, return sprocket 50, and a carriage drive chain 51. The drive chain is suitably secured to the carriage. Moreover, the control panel 36 on the carriage may be programmed for different drive speeds of rotation on the mandrel, and the programming apparatus will speed up or slow down both the mandrel rotation drive and the carriage drive, in order to maintain the correct pitch.

Figure 3:
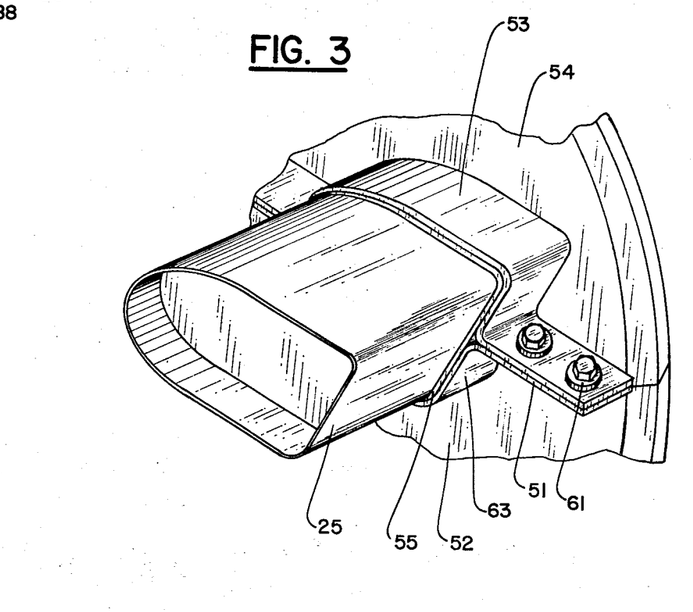
FIG. 3 is an enlarged fragmentary view of the spar mandrel and support ring shown in FIG. 2.

According to the invention, a desirable means of supporting the mandrel includes one or more split ring assemblies 43 which includes a pair of ring or plate halves 52 and 54. This assembly is shown in more detail in FIG. 3 in which each of the split ring halves 52 and 54 are provided with a connecting flange 59 and 57, respectively. These flanges are joined as illustrated and secured by appropriate bolt assemblies 61 or the like. The combined ring halves have an opening through the center and defined between clamp members 53 and 63. In supporting the spar mandrel during the process of the invention, the split ring halves are secured so that the mandrel is firmly wedged between the clamp members as illustrated in FIGS. 2 and 3. A rubber shim may also be used between the mandrel and clamp surfaces to allow moving of the ring and adjustment for buildup of the tape layers. The split ring assembly shown also includes an annular rolled angle member secured around the peripheral edge of the split ring assembly. The rolled angle member is also split with its seam coinciding with the split ring seam. This rolled angle member forms a track which is received in a V-shaped groove of the rollers 49. These rollers are fixed on a base support member 41, which also has rollers for travelling along track 37. Accordingly, as the mandrel is rotated, the split roller assembly simply also rotates on the apparatus as shown, thereby giving substantial support to the elongated mandrel between the mandrel ends. Again, although only one such split roller assemblies is shown, any desired number may be used depending on the length of the mandrel and the support desired during processing.

As the process is carried out, because of the ease in which the split ring support can be moved, the payout carriage assembly 44 can be advanced along the mandrel until the tape reaches the split ring location. The mandrel rotation and further carriage advance is then stopped, another split ring support placed behind the carriage, and the former split ring assembly then removed, whereupon the process may be continued with the carriage advance and mandrel rotation to the end of the mandrel. The carriage may then be reversed and the split ring assembly exchange repeated. Alternatively, the mandrel may be wrapped from the one end up to the split ring and the tape wrap then reversed and continued until the desired buildup is achieved on that portion of the mandrel. Thereafter the split ring can be parted, and moved so as to support the mandrel at an area which has already been wrapped. The tape payout carriage can then be advanced beyond the split ring whereupon mandrel wrapping may be then be continued until that portion of the spar or blade has been completed. Other means of carrying out the process utilizing the apparatus may be used within the purview of the invention.

FIG. 5 illustrates an alternate apparatus embodiment in which the spar or blade mandrel 10 is held stationary while a rotating tape and filament payout apparatus wraps the tape and filament circumferentially around the one piece mandrel. The apparatus also includes a pair of posts 15 and 21 at each end supporting mandrel axle 12 and a pair of retractable intermediate supports 72 and 74, each of which is provided with a saddle 19 on which the mandrel rests. Such supports are needed for long, slender mandrels, wrapped according to the present invention, which otherwise would bend and distort during the process. Of course, shorter or stiffer mandrels might not require such supports. The payout assembly comprises a rotating wheel 60 supported on a stand 73 and base member 71. The stand and wheel have an enlarged orifice through which the mandrel extends. Base member 71 is driven along track 76 by suitable means, not shown, and wheel 60 is also rotatably driven relative to stand 73 and stationary mandrel 10 as the payout assembly is advanced along the mandrel length. The overlap of successive transverse filament tape convolutions is not changed from the process previously disclosed. The tape is paid out from a reel 69 as the payout assembly is advanced along the mandrel length, and at the same time, continuous filaments or strands may also be paid out from spools 65, the strands being directed through an eyelet member 67 so that the individual filamentary strands are wrapped in a uniform layer.

If desired, reinforcement and/or buildup of a spar or blade may be made. For example, because a blade is bolted or otherwise secured to a rotor hub, the blade structure should be reinforced at the root for forming a bolted joint. Similarly other portions or areas may be reinforced. Special materials such as boron or graphite fiber materials may be selected for special strength properties in those areas as will be appreciated by those skilled in the art.

The apparatus may also include means for impregnating the glass tape and filamentary strands with a thermosetting synthetic resin composition or they may be impregnated prior to installation on the apparatus. Again, drive means for advancing the support base 71 at a proper speed and coordinating that travel with rotation of payout wheels 60 will be necessary to achieve the desired overlap of tape on the mandrel. Retractable supports 72 and 74 will be retracted through openings 79 and 77, respectively, as the payout assembly approaches one of the supports. Thus, the two supports remain in place against the mandrel until the payout assembly needs to pass by the supported area of the mandrel, in which case the respective individual support is retracted for the necessary time to provide for passage of the payout assembly. This apparatus and process may be preferred for longer mandrels because the supports hold the mandrel stationary in its stiffest orientation. That is, with its major width vertical, as the rotating wheel or "ring winder" wraps the tape therearound. This stationary mandrel method thus reduces deflection and eliminates the "flip-flop" cyclic bending of long and less stiff mandrels as compared to the apparatus and process previously described regarding FIG. 2.

Figure 9:
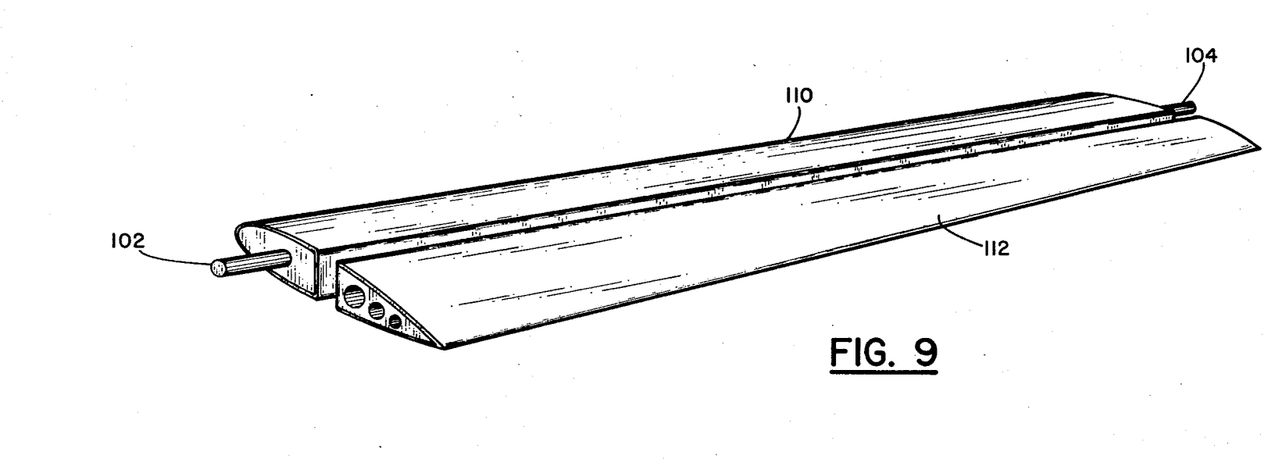
FIGS. 9 and 10 illustrate preparation of a blade according to the invention.
Figure 10:
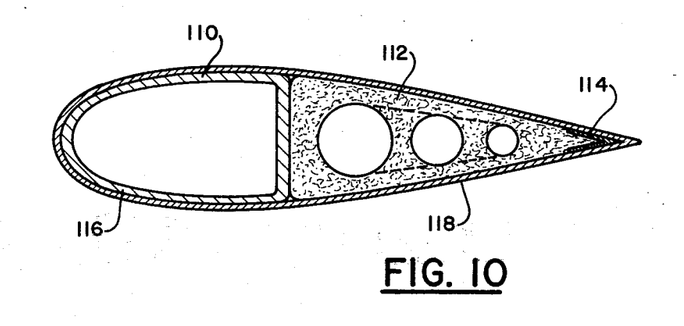

FIG. 10 illustrates a cross-section of a blade produced according to the invention, incorporating a spar 110 prepared by a process as previously described. As illustrated in FIG. 9, a trailing edge core 112 is bonded to spar 110, still secured on its mandrel, shafts 102 and 104 of which are shown. The assembly becomes a "mandrel" on which transverse filament tape is wound to form the final blade assembly. The thermosetting resin impregnated transverse filament tape spar structure 116 is bonded directly to the trailing edge core 112 which may suitably comprise bonded slabs of rigid foamed plastics such as polyurethane, expanded elastomers, or paper honeycomb. Of course, any suitable and equivalent materials may be used for such a core and those mentioned are by way of example only. If desired, a sharp trailing edge may be improved by providing a layup or molding 114.

The above described spar and core assembly is then secured on apparatus as previously described and resin impregnated transverse filament tape 118 is wrapped on the assembly, repeating the same procedures for circumferentially wrapping the tape at low pitch. Following the winding process described, the spar or blade is cured and removed from the mandrel. Curing may occur at room temperature, depending on the specific type of curing agent and resin used, or at elevated temperatures, as in an oven, as necessary. When the mandrel is hollow, as previously described, curing of the spar may be achieved by introducing steam or hot fluid through the mandrel, or the mandrel may be electrically heated, after which the mandrel may be cooled by water. Thereafter, the mandrel is extracted by suitable means and the spar or blade composite may be further processed as desired. Other modification of the apparatus as well of the process within the purview of the invention described here will be evident to those skilled in the art.

I claim:

1. An elongated composite tapered blade or spar having a longitudinal axis extending between a root end and a tip end having any interior recess therein and tapered cross sectional dimensions from the root to the tip ends thereof, said blade or spar being subject to securement at its root end to a support and to cyclical loading while in use, comprising:
   a resin bonded mass constituting a plurality of layers of successive helically wrapped convolutions of a synthetic resin impregnated tape,
   said convolutions of varying transverse dimension thereby defining a tapered configuration to the blade or spar,
   said tape comprising elongated cut filaments lying substantially parallel and having substantially equal lengths and carried by longitudinal continuous filaments helically wound continuously through substantially the entire blade or spar
   wherein said elongated cut filaments constitute at least 95% of said tape by weight and the length of said filaments is short compared to the length of said blade or spar;
   wherein successive convolutions of said filaments are overlapped about 50% of their length and where the axis of the elongated filaments lie at an angle of less than 30 degrees from the longitudinal axis of said blade or spar;
   whereby said filaments provide resistance to bending about the longitudinal axis of said blade or spar;
   said cut filaments constituting substantially entirely the structural support element of said spar or blade.

2. The blade or spar of claim 1 wherein tape layers of said 50% overlap adjacent tape convolutions are staggered so that the ends of filaments in adjacent layers do not coincide.

3. The blade or spar of claim 2 wherein said filament ends are present in a single plane extending at 90 degrees from the elongated spar longitudinal axis no more than one in every four tape layers.

4. The blade or spar of claim 3 wherein a majority of said filaments lie along a plane substantially parallel with said blade or spar axis and said continuous filaments are helically wound,
   whereby said continuous filament and said cut filaments define a parallelogram and said cut filaments conform to the tapered shape without wrinkles.

5. The blade or spar of claim 4 including a layer of continuous substantially parallel glass filamentary strands in which the angle between the axis of the strands and the cut filaments is between about 70° and about 110°.

6. The blade or spar of claim 5 wherein the ratio of cut filaments:strands is about 6:1 and about 20:1 by weight, respectively.

* * * * *

UNITED STATES PATENT AND TRADEMARK OFFICE
CERTIFICATE OF CORRECTION

PATENT NO. : 4,264,278
DATED : April 28, 1981
INVENTOR(S) : Oscar Weingart

It is certified that error appears in the above-identified patent and that said Letters Patent are hereby corrected as shown below:

On the cover page, Item [73] should read:

Structural Composites Industries, Inc.
6344 North Irwindale Avenue
Azusa, CA 91702

Claim 1, Column 11, line 34, after "spar" insert a semicolon.
Claim 1, Column 12, line 9, after "spar;" insert ---and---.

Signed and Sealed this

Eleventh Day of August 1981

[SEAL]

Attest:

GERALD J. MOSSINGHOFF

Attesting Officer      Commissioner of Patents and Trademarks